United States Patent [19]

Richter et al.

[11] Patent Number: 4,781,027

[45] Date of Patent: Nov. 1, 1988

[54] MULTI-CYLINDER INTERNAL COMBUSTION ENGINE WITH TWO EXHAUST GAS TURBOCHARGERS

[75] Inventors: Axel Richter, Wimsheim; Jochen Lorenz, Ingersheim; Ulrich Eger, Schwieberdingen, all of Fed. Rep. of Germany

[73] Assignee: Dr. Ing.h.c.F. Porsche Aktiengesellschaft, Stuttgart, Fed. Rep. of Germany

[21] Appl. No.: 72,755

[22] Filed: Jul. 13, 1987

[30] Foreign Application Priority Data

Jul. 12, 1986 [DE] Fed. Rep. of Germany ....... 3623540

[51] Int. Cl.$^4$ .............................................. F02B 37/12
[52] U.S. Cl. ......................................... 60/602; 60/612
[58] Field of Search ................ 60/600, 601, 602, 603, 60/612

[56] References Cited

U.S. PATENT DOCUMENTS

| | | | |
|---|---|---|---|
| 4,422,296 | 12/1983 | Dinger et al. | 60/612 |
| 4,686,830 | 8/1987 | Buck et al. | 60/602 X |
| 4,697,421 | 10/1987 | Otobe et al. | 60/602 |
| 4,709,552 | 12/1987 | Rutschmann et al. | 60/612 X |

FOREIGN PATENT DOCUMENTS

| | | |
|---|---|---|
| 0046872 | 7/1981 | European Pat. Off. . |
| 0178485 | 9/1985 | European Pat. Off. . |
| 3531744 | 3/1986 | Fed. Rep. of Germany . |
| 3216707 | 8/1986 | Fed. Rep. of Germany . |
| 2540180 | 8/1984 | France . |
| 8300532 | 7/1982 | PCT Int'l Appl. . |

Primary Examiner—Michael Koczo
Attorney, Agent, or Firm—Barnes & Thornburg

[57] ABSTRACT

A multi-cylinder internal combustion engine with two exhaust gas turbochargers of which one is adapted to be switched-in during the operation of the internal combustion engine by way of a switch-in valve controllable on the turbine side and by way of a check valve on the compressor side. Furthermore, a controllable blow-off valve (waste gate) is installed into a by-pass line which by-passes both turbines. The blow-off valve and the switch-in valve are controllable by a control apparatus as a function of condition magnitude of the internal combustion engine. The activation of the blow-off valve and of the switch-in valve is subjected to an anticipatory control dependent on condition magnitudes on which at least one charging-pressure-dependent regulation is superimposed. The regulation has advantageously a PID-like structure whereby the regulating parameters are condition-dependent. The regulation and control are additionally subjected to static as well as dynamic limitations. A noticeable improvement of the power output, respectively, torque behavior of the internal combustion engine results from the deliberate control and regulation of the charging system.

41 Claims, 8 Drawing Sheets

FIG.3

| tvh | Switch-In Valve | Blow-off Valve | Type of Operation |
|---|---|---|---|
| 200 | Closed | Closed | |
| 199 ⋮ 101 | Cyclically Operated With tvh - 100 | Closed | One-Supercharger-Operation |
| 100 | Open | Closed | |
| 99 ⋮ 1 | Open | Cyclically Operated With tvh | Two-Supercharger-Operation |
| 0 | Open | Open | |

FIG.4
$tvhk = f(nmot, dkwin)$

| nmot/(U/m) \ dkwin/(°) | 3 | 4 | 25 | 45 | 60 | 80 |
|---|---|---|---|---|---|---|
| 2000 | 200 | 100 | 100 | 120 | 160 | 200 |
| 3000 | 200 | 100 | 130 | 140 | 165 | 180 |
| 3300 | 200 | 100 | 115 | 145 | 160 | 180 |
| 3680 | 200 | 100 | 120 | 140 | 155 | 180 |
| 4000 | 200 | 100 | 110 | 130 | 150 | 175 |
| 4280 | 100 | 0 | 30 | 40 | 50 | 55 |
| 5000 | 100 | 0 | 0 | 10 | 30 | 40 |
| 6000 | 100 | 0 | 0 | 10 | 25 | 35 |
| 7000 | 100 | 0 | 0 | 0 | 20 | 30 |
| 8000 | 100 | 0 | 0 | 0 | 0 | 0 |

FIG.5
$tvhh = fh(nmot, dkwin)$

| nmot/(U/m) \ dkwin/(°) | 3 | 4 | 25 | 45 | 65 | 78.1 |
|---|---|---|---|---|---|---|
| 3300 | 200 | 100 | 120 | 145 | 160 | 180 |
| 3680 | 200 | 100 | 120 | 140 | 155 | 180 |
| 4000 | 100 | 0 | 30 | 40 | 55 | 55 |
| 4280 | 100 | 0 | 30 | 40 | 50 | 55 |

FIG. 7 tvhkf"=ftkf(tll)

| tll / (°C) | tvhkh" |
|---|---|
| 10 | 0 |
| 30 | 0 |
| 60 | 0 |
| 85 | 18 |

FIG. 8 psoll=fpsoll (nmot,dkwin)

dkwin/(°) →

| nmot/(U/m) ↓ | 25 | 45 | 65 | 80 |
|---|---|---|---|---|
| 2000 | 1350 | 1400 | 1800 | 2000 |
| 3000 | 1450 | 1700 | 1900 | 2100 |
| 3300 | 1350 | 1600 | 1850 | 2100 |
| 3680 | 1350 | 1600 | 1700 | 2000 |
| 4000 | 1350 | 1650 | 1800 | 2000 |
| 4280 | 1300 | 1600 | 1800 | 2000 |
| 5000 | 1200 | 1500 | 1800 | 1900 |
| 6000 | 1000 | 1450 | 1750 | 1800 |
| 7000 | 1000 | 1450 | 1750 | 1800 |
| 8000 | 1000 | 1400 | 1500 | 1700 |

FIG. 9 psoll"=ftdp(tll)

| tll/(°C) | dp" |
|---|---|
| 10 | 1,0 |
| 30 | 1,0 |
| 60 | 1,0 |
| 85 | 0,92 |

FIG. 11 rkp=frkp(nmot, dkwin)

| nmot/(U/m) \ dkwin/(°) | 30 | 45 | 65 | 80 |
|---|---|---|---|---|
| 2000 | 175 | 165 | 140 | 135 |
| 4000 | 185 | 165 | 150 | 120 |
| 6000 | 185 | 165 | 145 | 120 |
| 7000 | 170 | 165 | 140 | 90 |

FIG. 12 rki=frki(nmot, dkwin)

| nmot/(U/m) \ dkwin/(°) | 30 | 45 | 65 | 80 |
|---|---|---|---|---|
| 2000 | 22 | 17 | 15 | 20 |
| 5000 | 22 | 20 | 10 | 19 |
| 6000 | 20 | 17 | 14 | 16 |
| 7000 | 27 | 20 | 17 | 5 |

FIG. 13 rkd=frkd(nmot, dkwin)

| nmot/(U/m) \ dkwin/(°) | 35 | 40 | 60 | 80 |
|---|---|---|---|---|
| 2000 | 100 | 128 | 128 | 128 |
| 4500 | 100 | 128 | 128 | 128 |
| 6500 | 100 | 128 | 128 | 128 |
| 7500 | 100 | 128 | 128 | 128 |

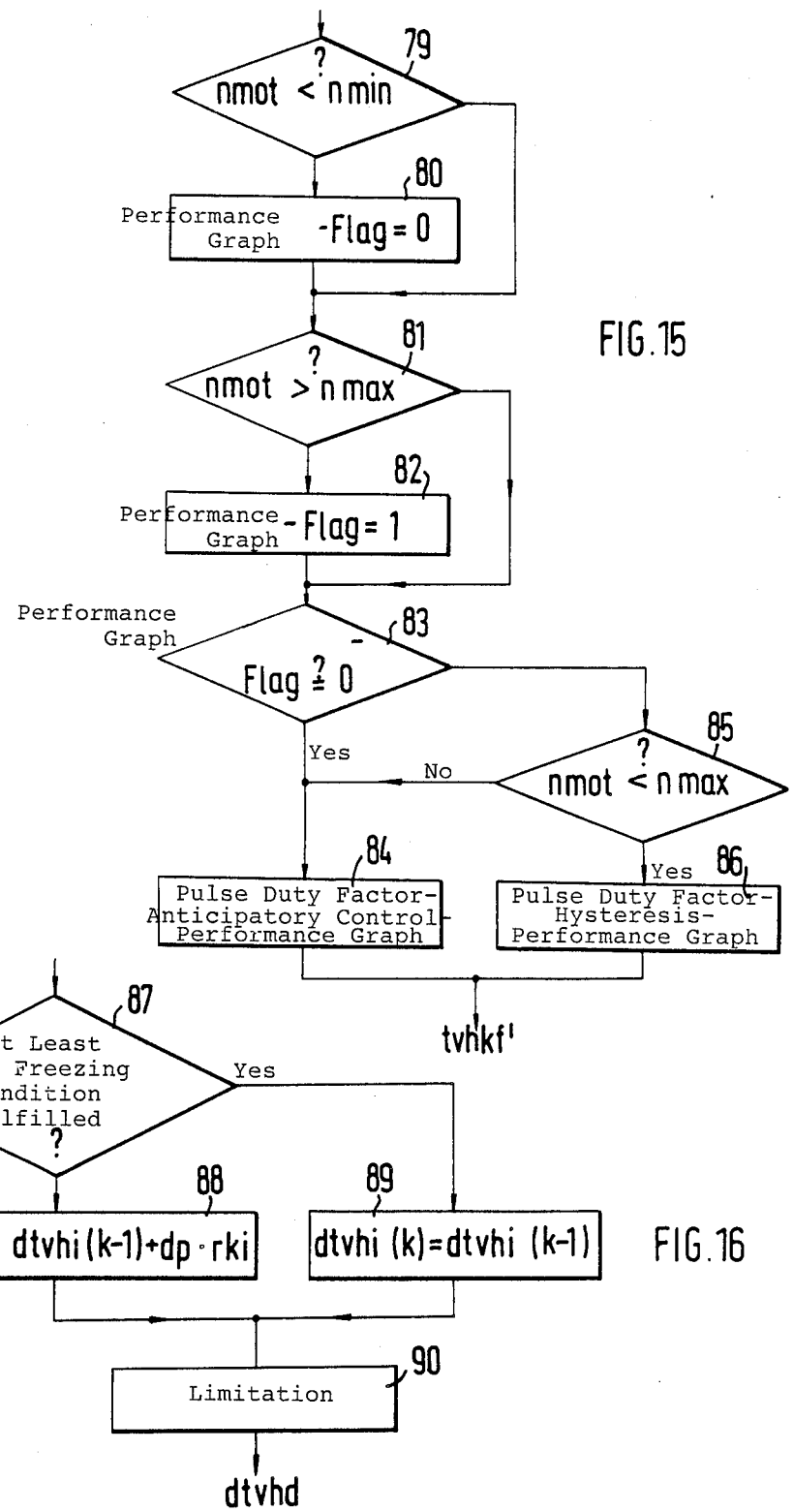

MULTI-CYLINDER INTERNAL COMBUSTION ENGINE WITH TWO EXHAUST GAS TURBOCHARGERS

BACKGROUND AND SUMMARY OF THE INVENTION

The present invention relates to an internal combustion engine with preferably two exhaust gas turbochargers consisting each of a turbine and of a compressor driven by the turbine, whose compressors are connected by way of separate charging pressure lines to a common suction manifold and whose turbines are connected into separate exhaust gas lines starting from an exhaust gas manifold, in which one exhaust gas turbocharger is adapted to be connected-in in addition to the other exhaust gas turbocharger during the operation of the internal combustion engine, and in which a controllable blow-off valve (waste gate) is connected into a by-pass line starting from the exhaust gas manifold and by-passing the turbines of both exhaust gas turbochargers and a controllable switch-in valve is connected into the exhaust gas line of the turbine of the exhaust gas turbocharger adapted to be connected-in.

By equipping internal combustion engines with exhaust gas turbochargers, it is possible to regain at least a part of the energy loss present in the exhaust gases and to conduct it again back to the internal combustion engine. Conditioned by the manner of operation of the exhaust gas turbochargers, to supply significant charging pressures only with a large exhaust gas stream, the disadvantage results, especially for the strongly non-steadily operated vehicle engines, of inadequate power output and lacking torque in the lower rotational speed, respectively, load range.

It has therefore already been proposed to equip the internal combustion engine with two exhaust gas turbochargers whereby one is specifically designed for the lower load range of the internal combustion engine, and the second exhaust gas turbocharger is additionally switched-in or connected-in in addition to the first turbocharger in order to cover the full load range of the internal combustion engine. A supercharging system is created with such a system, as is described, for example, in the DE-OS No. 34 20 015 and corresponding U.S. Pat. No. 4,709,552, which produces a noticeable torque and power output increase of the internal combustion engine already at low rotational speeds and is effective over the entire rotational speed range without significant power output collapse.

It is the object of the present invention to further optimize this supercharging system by a deliberate electronic regulation, respectively, control, to further reduce the power output and torque collapses in the transition areas between the differing load conditions and to protect the internal combustion engine and exhaust gas turbochargers effectively against overloads.

The underlying problems are solved according to the present invention in that the activation of the blow-off valve and of the switch-in valve is subjected to an anticipatory control dependent on condition magnitudes (parameters) on which is superimposed at least one regulation dependent on the suction pipe pressure.

The advantages of the present invention reside in the first instance in that the charging system according to the DE-OS No. 34 20 015 and corresponding U.S. Pat. No. 4,709,552, is further optimized by a deliberate electronic regulation, respectively, control matched to the differing operating conditions of the internal combustion engine inclusive the supercharging system and a collapse in the power output, respectively, torque behavior of the overall system is practically no longer noticeable.

The thus-supercharged internal combustion engine exhibits an overall behavior which corresponds to an internal combustion engine of significantly larger volume with larger number of cylinders. Therebeyond, it is achieved that the internal combustion engine and the supercharging system are reliably protected against overload/damage.

BRIEF DESCRIPTION OF THE DRAWINGS

These and other objects, features, and advantages of the present invention will become more apparent from the following description when taken in connection with the accompanying drawing which shows, for purposes of illustration only, several embodiments in accordance with the present invention, and wherein:

FIG. 3 is a table with a coordination of pulse duty factor to operating ranges;

FIG. 4 is a quanticized and digitalize pulse duty factor-anticipatory control-performance graph (set of characteristic curves) illustrated as a table;

FIG. 5 is a table according to FIG. 4, however, for a pulse duty factor-hysteresis-performance graph;

FIG. 7 is a table according to FIG. 4, however, for a charging air temperature-anticipatory control-correction characteristic curve;

FIG. 8 is a table according to FIG. 4, however, for a desired pressure-performance graph;

FIG. 9 is a table according to FIG. 4, however, for a charging-air temperature-desired pressure-correction characteristic curve;

FIG. 11 is a table according to FIG. 4, however, for a proportional parameter-performance graph;

FIG. 12 is a table according to FIG. 4, however, for a integral parameter-performance graph;

FIG. 13 is a table according to FIG. 4, however, for a differential parameter of the performance graph;

FIG. 15 is a flow diagram of a switching module in accordance with the present invention;

FIG. 16 is a flow diagram of an integral component module in accordance with the present invention;

DETAILED DESCRIPTION OF THE DRAWINGS

Figure 1:
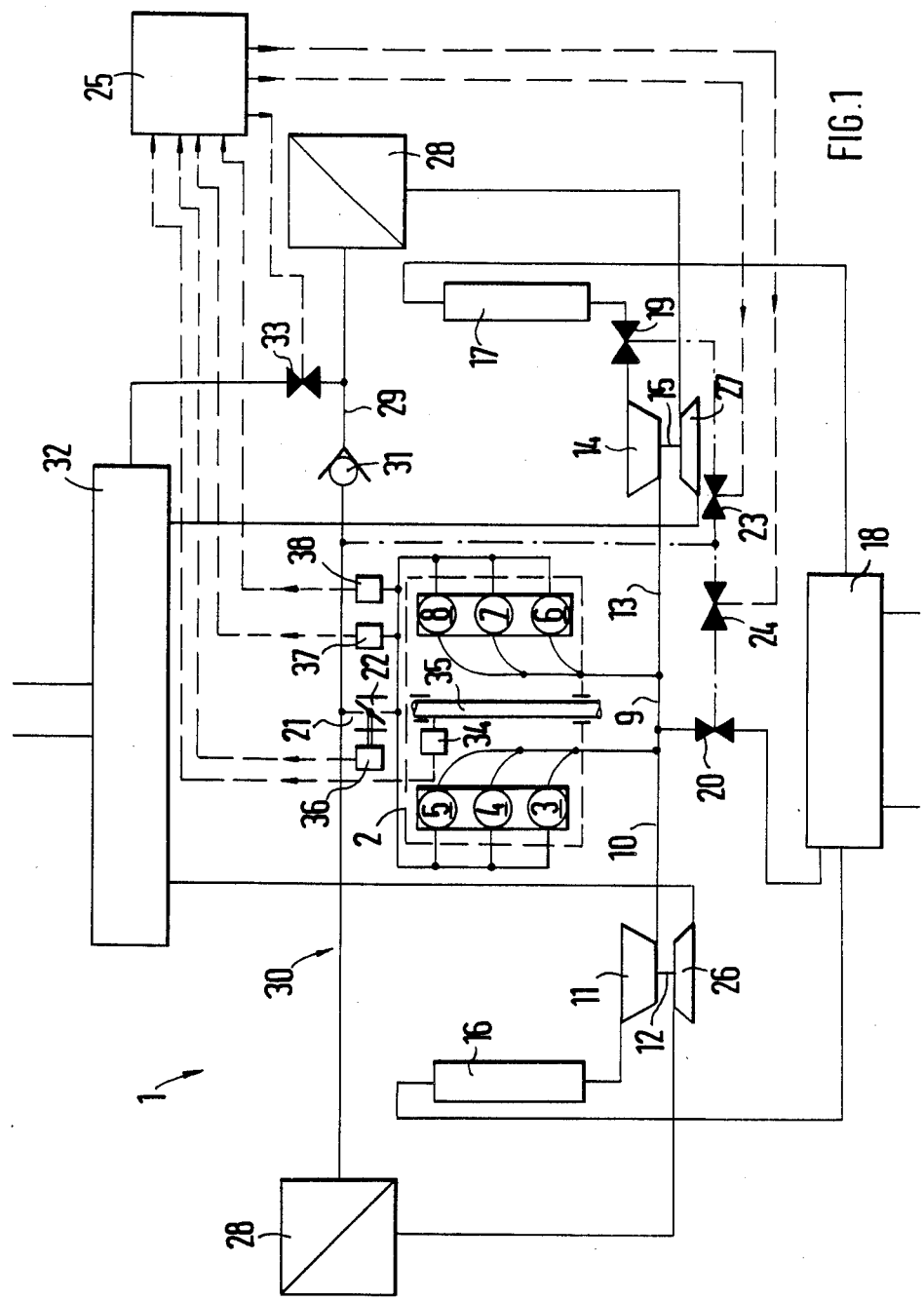
FIG. 1 is a block diagram of an exhaust gas turbocharger installation of a multi-cylinder internal combustion engine in accordance with the present invention.

Referring now to the drawing wherein like reference numerals are used throughout the various views to designate like parts, FIG. 1 illustrates an exhaust gas turbo installation generally designated by reference numeral 1 for an internal combustion engine 2. Cylinders 3 to 8 are subdivided (in a non-necessary manner) into two groups. The exhaust gas pipes from the cylinders terminate in a common exhaust gas pipe or manifold 9 from which branches off an exhaust gas line 10 for the drive of a turbine 11 of a first exhaust gas turbocharger 12 and a further exhaust gas line 13 for the drive of a turbine 14 of a second exhaust gas turbocharger 15. The outlet of the turbines 11 and 14 can be conducted either by way of front mufflers 16, 17, respectively, catalysts or also directly by way of pipe lines to a main muffler 18.

A switch-in valve 19 is connected into the exhaust gas line 13 of the turbine 14 which may be arranged upstream as also downstream of the turbine 14. Furthermore, the exhaust gas manifold 9 is connected with the main muffler 18 by way of a blow-off valve (waste gate) 20. The switch-in valve 19 and the blow-off valve 20 are pneumatically actuated valves which are open in the non-activated condition. Pneumatic auxiliary energy which is taken off from a suction manifold 21 upstream of a power output control device (throttle valve) 22, is fed to the valves 19, 20 by way of control valves 23, 24 coordinated thereto. The electrically operated control valves 23, 24 are acted upon by a control apparatus 25 with a pulse duty factor and are closed in the non-activated condition. More accurately considered, a control space of the switch-in valve 19, respectively, of the blow-off valve 20 is connected corresponding to the existing pulse duty factor, more or less with a pressure medium of high pressure (by way of the pressure take-off place in the suction manifold 21 upstream of the throttle valve 22), respectively, with a pressure medium of low pressure, for example, of the atmosphere (pressure take-off place in the air filter 32), whereby in the non-activated condition of the control valves 23, 24, the control space is at atmospheric pressure; for reasons of ease of viewing, such a consideration was dispensed with in FIG. 1.

The compressor 26 and 27 driven by the turbines 11 and 14 supply compressed air by way of charging air coolers 28 to the suction manifold 21; the charging air is distributed from the suction manifold 21 uniformly to the individual suction pipes leading to the cylinders 3 to 8. A check valve 31 as is described more fully in the DE-OS No. 34 20 015 and corresponding U.S. Pat. No. 4,709,552, is connected into a partial section 29 of a charging air line generally designated by reference numeral 30. A vent valve 33 is connected into a by-pass with respect to the compressor 27, which connects the partial section 29 of the charging air line 30 with an air filter 32; the vent valve 33 is adapted to be controlled by way of the control apparatus 25.

Finally, the control apparatus 25 receives signals from a rotational speed sensor 34 (rotational speed nmot of the crankshaft 35 of the engine 2), from a throttle valve position sensor 36 (position of the throttle valve 24, throttle valve angle dkwin), from a suction pipe pressure sensor 37 (suction pipe pressure pist in the suction pipe 22, downstream of the throttle valve) and from a temperature sensor 38 (charging air temperature t11), which it converts into corresponding activating signals for the control valves 23 and 24 of the switch-in valve 19 and of the blow-off valve 20 and for the vent valve 33.

The control apparatus 25 is constructed in a known manner as microcomputer and includes essentially a single-chip microcomputer or a microprocessor, for example, of the type 8031 of Intel, volatile and non-volatile memory devices, analog, respectively, digital input and output components as well as matching and driver components. Individual regulating and control modules are realized as software and are filed or stored in the non-volatile memories together with characteristic curves and performance graphs (set of characteristic curves) detected at restart or data points, quanticized and digitalized.

The suction pipe pressure pist, charging air temperature t11, rotational speed nmot and throttle valve angle dkwin are picked-up analog or digital and can also be made available to the control apparatus 25 possibly by an engine management computer. Analog magnitudes are thereby converted by way of an A/D converter into signals utilizable for the microprocessor.

Of course, the control apparatus may also be made-up in a discrete manner of analog-digital components/chips.

Figure 2:
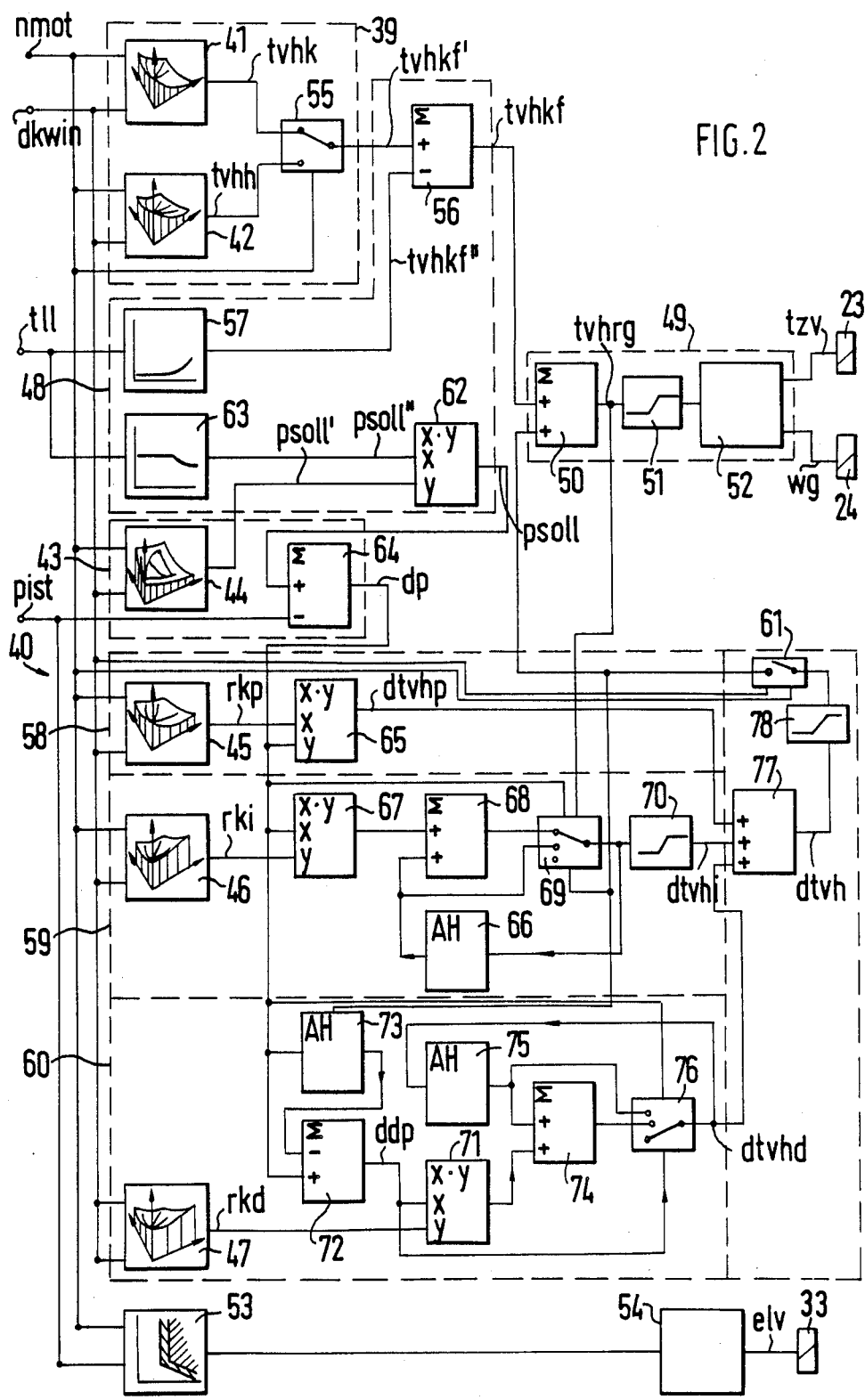
FIG. 2 is a block diagram of a control/regulation of the exhaust gas turbocharger system according to the present invention.

The functions of the control apparatus are illustrated in FIG. 2 as block diagram of control, respectively, regulating modules. The activation of the two valves in the exhaust gas connection (of the switch-in valve 19 and of the blow-off valve 20, respectively, the control valves 23 and 24 thereof) takes place in principle corresponding to an anticipatory control (anticipatory control module 39) dependent on the condition magnitudes or operating parmeters of the internal combustion engines, on which is superimposed a regulation dependent at least on suction pipe pressure (regulating module 40). The activation value is subjected to appropriate static as well as dynamic liitations. The anticipatory control takes place by way of performance graphs 41 and 42 (set of characteristic curves) which coordinate to a value pair of the condition magnitudes (rotational speed nmot and throttle valve angle dkwin) a pulse duty factor--performance graph tvhk, respectively, pulse duty factor-hysteresis value tvhh for the pulse duty factor. Anticipatory control is sometimes referred to as pilot control.

The regulating module 40 has a PID-like structure whereby the desired value (pso11' desired value preset module 43) and the regulation parameters (rki, rkp, rkd) are dependent on the operating point and are readied by way of performance graphs 45-47 in dependence on rotational speed nmot and throttle valve angle dkwin. The anticipatory control signal and the desired value pso11 are acted upon by means of a correction (correcting module 48) dependent on the charging air temperature t11, whereby with an increase of the charging air temperature t11 the charging air pressure is acted upon in an output-reducing sense in order to prevent a knocking of the internal combustion engine 2.

In the activating module 49, the values of anticipatory control tvhkf to produce signal tvhrg which is regulation dtvh are combined at 50 and subjected at 51 to appropriate static as well as dynamic limit-respectively. Matching functions are split into activating signals tzv, for the switch-in valve 19, and wg, the blow-off valve 20, which are converted into pulse duty factors and are conducted by way of a driver stage 52 to the control valves 23 and 24.

Finally, the vent valve 33 is activated by way of a hysteresis performance graph 53 which determines from a value pair consisting of the suction pipe pressure pist and the engine rotational speed nmot, whether the vent valve 33 is to be opened or closed by way of a driver stage 54; a pumping operation of the second exhaust gas turbocharger 15 is avoided thereby. Furthermore, a pressure shock results in the partial section 29 of the charging-air line 30 during the build-up of charging pressure as a result of the closing of the valve 33 so that a valve body (shown in the DE-OS No. 34 20 015and corresponding U.S. Pat. No. 4,709,552 ) of the check valve 30 is assisted in lifting off from its seat.

The function of the switch-in valve 19 and of the blow-off valve 20 can be explained as follows:

The switch-in valve 19 enables a continuously adjustable admission of the second exhaust gas turbocharger 15 with exhaust gas and an acceleration of its compressor shaft. The exhaust gas quantity which flows through the exhaust gas turbocharger 15 reduces at the same time the exhaust gas quantity flowing to the first exhaust turbocharger 12 so that the function of the switch-in valve 19—as regards the first exhaust gas turbocharger 12—corresponds to that of a waste gate (blow-off valve) with a single supercharged engine, i.e., with an engine supercharged by a single turbocharger.

The waste gate 20 is a common blow-off valve for both exhaust gas turbochargers (12, 15).

The activation of the switch-in valve 19 and of the blow-off valve 20 takes place in such a manner that a closing degree (100% corresponds to the closed condition of the switch-in valve and of the blow-off valve) is determined by the pulse duty factor (at constant keying frequency) which exists at the respective control valve (operated in clock controlled or time-controlled fashion); the control range thereby lies between 0% and 100%. An activation of both valves with a pulse duty factor differing from 0, respectively, 100% (non-activated, respectively, fully activated) takes place in principle alternatively for both valves, i.e., there is no condition point of the internal combustion engine 2 at which both valves are acted upon at the same time with such a pulse duty factor.

The possibility follows therefrom to represent the condition of both valves unequivocally only by one reference numeral, a "pulse duty factor tvh" with the range 0 to 200 (see FIG. 3): Within the range of 0 to 100 tvh represents directly the pulse duty factor (second pulse duty factor wg) for the blow-off valve 20. Within the range between 100 and 200, the pulse duty factor (first pulse duty factor tzv) for the switch-in valve 19 results from tvh by subtraction of 100. The blow-off valve 20 is fully activated in this range, i.e., is closed.

Thus, only one performance graph is required for both valves; a numerically continuous transition of the activation from one valve to the other thus results so that additionally the regulation is simplified. The range of tvh > 100 up to tvh=200 will be referred to hereinafter as "one-supercharger-operation" (even if the second supercharger already starts to operate in this range) and the range from tvh=0 to tvh=100 will be referred to as "two-supercharger-operation."

The determination of the pulse duty factor anticipatory control value tvhkf takes place, as already described hereinabove, by way of performance graphs 41 and 42 from the rotational speed nmot and the throttle valve angle dkwin. An example for a pulse duty factor-anticipatory control performance graph can be seen from FIG. 4.

In proximity of the switch-in point, the power output data of the internal combustion engine in the two operating conditions
(a) tvhk slightly less than 100, i.e., the blow-off valve 20 is closed, the switch-in valve 19 is nearly completely opened; the exhaust gas counter pressure is high and
(b) tvhk is smaller than 100, i.e., the switch-in valve 19 is fully opened, the blow-off valve 20 is partially opened, and the exhaust gas counter-pressure is low, are to be nearly equal (whereby at b) the efficiency of the engine is higher).

For dynamic reasons, however, a rapid switching-over into the condition b) is desired. This behavior is realized in that in the pulse duty factor-anticipatory control-performance graph tvhk=f (nmot, dkwin) at each load line (given by dkwin=constant) the pulse duty factor-performance graph tvhk over nmot carries out a steep jump at the switch-in point from greater than 100 toward smaller than 100. If the operating point of the internal combustion engine moves within the range of the switch-in point (tvhk=100), then this leads to an undesirable to and fro jumping between the operating points (a) and (b).

Figure 6:
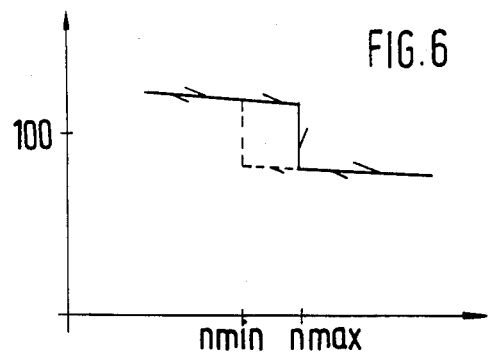
FIG. 6 is a diagram which explains the switching operation between the pulse duty factor-anticipatory control and the hysteresis-performance graph.

The pulse duty factor-hysteresis-performance graph tvhh=fh (nmot, dkwin) 42 provides a remedy therefor, for which an example is illustrated in FIG. 5. The switching between the performance graphs 41 and 42 takes place by way of a switching module 55 (see FIG. 2), which fulfills the function of the diagram according to FIG. 6. If the operating point is on the full line characteristic curve portion of the diagram, then the anticipatory control module 39 produces the value of the pulse duty factor-anticipatory controlperformance graph 41; if the operating point is on the dash line, the control module 29 then produces the value of the pulse duty factor-hysteresis-performance graph 42. A flow diagram for this switching module 55 will be more fully described hereinafter.

A further problem occurs during the switching operation owing to the transition from high load to coasting operation (throttle valve 22 not activated): a high pressure exists thereby for a short period of time in the charging air line upstream of the throttle valve 22—the pick-up place for the auxiliary pressure is located thereat. If now a pulse duty factor of 100 exists for rotational speeds nmot below a rotational speed limit value for the switching-over into the two supercharger-operation, then the turbine switch-in valve is suddenly pushed open fully, as a result of which the first exhaust gas turbocharger 12 loses rapidly in energy. Analogous is alsottrue above this rotational speed limit value, i.e., in the two-supercharger-operation; a pulse duty factor tvhk=0 would mean in this case that the blow-off valve 20 opens and thus valuable energy is lost for both exhaust gas turbochargers.

The pulse duty factor-anticipatory control-performance graph 41 according to FIG. 4 therefore includes a further peculiarity: each rotational speed characteristic curve nmot =constant carries out at the lower end of the value range of the throttle valve angle dkwin a steep jump in the pulse duty factor-performance graph value tvhk. The pulse duty factor performance graph value tvhk is thereby fixed for rotational speeds which lie below the rotational speed limit values for the switching-over into the two-supercharger-operation, to its maximum value tvhk=200 and for rotational speeds which lie above this limit value, to the value of the switch-in point tvhk=100.

The uncorrected pulse duty factor-anticipatory control value tvhkf' is finally subjected to a correction dependent on the charging air temperature t11 in the correcting module 48, which at 56 reduces the uncorrected pulse duty factor-anticipatory control value tvhkf' by an amount tvhkf'', which is taken from a charging air temperatr:re- anticipatory control-characteristic curve 57 according to FIG. 8. The pulse duty factor-anticipatory control value tvhkf results therefrom.

The regulating module generally designated by reference numeral 40 is composed of a proportional module 58, of an integral module 59 and of a differential module 60. The regulating component dtvh which exists at the output of the regulating module 40, however, is only active (switching module 61), insofar as the rotational speed nmot and the throttle valve angle dkwin lie at the same time above threshold values nreg and dkwreg determinative for the start of the regulation, see FIG. 10, non-cross-hatched area I. If at least one of the two parameters lies under its determinative threshold value (cross-hatched area II), the calculation of the regulating component dtvh is dispensed with and the latter is set to zero.

If the regulating module 40 is realized by software, then the calculation of the regulating component dtvh takes place in fixed time intervals. This makes it possible to replace the integral per time of the integral component 59 by a sum and the differential per time of the differential component 60 by a difference.

In the desired value preset module 43, at first the uncorrected charging pressure-desired value pso11' is readied by way of the desired pressure performance graph pso11'=fpso11 (nmot, dkwin) according to FIG. 8. The uncorrected charging pressure-desired value pso11' is multiplicatively corrected at 62 in the correcting module 48, with a value pso11'', which is determined from the charging air temperature in the correcting module by way of a charging air temperature-desired pressure-characteristic curve pso11' =ftps (t11) at 63 according to FIG. 9 to the desired pressure pso11. Finally, the regulating difference dp is determined by the difference formation at 64 of the suction pipe pressure pist with the desired pressure pso11.

The proportional component dtvhp=dp*rkp is determined in the proportional module 58 by multiplication at 65 of the regulating difference dp with the Proportional parameter rkp which is determined at 45 from the proportional parameter-performance graph rkp=frkp (nmot, dkwin), see also FIG. 11.

The integral component dtvhi(k)=dtvhi(k−1)+dp*rki is determined by summation in that the value of the I-component dtvhi(k−1) calculated at the preceding point of time (k−1) (symbolically illustrated in FIG. 2 by a memory-element at 68) is added 66 to the product dP*rki 67 from the integral parameter rki and the regulating difference dp. The integral parameter rki=frki (nmot, dkwin) is thereby determined from the integral parameter- performance graph 46 (see also FIG. 12).

However, the new calculation of the I-component dtvhi(k) is subjected to certain conditions (freezing conditions), during the occurrence of which a switching module 69 maintains the old value dtvhi(k−1), from which results a local stability of the I-component results and the "running away" thereof is prevented, for example if the sunmation value tvhrg runs into the limitation.

The following conditions lead to the maintenance of the old value:
1. |dp| is larger than dpmax,
2. tvhrg=200 and dp greater than 0 (stcp at top),
3. tvhrg=0 and dp smaller than 0 (stop at bottom),
4. tvhrg=100 dp larger than 0 and two-supercharger operation (stop at top in two-supercharger operation).

Finally, the I-component is subjected additionally to a limitation 70 because the I-component is to influence the pulse duty factor only limitedly (for example, |dtvhi| is smaller than 30).

The differential component dtvhd(k)=dtvhd(k−1)+ddp*rkd is determined by multiplication at 71 of the change with respect to time of the regulating difference ddp=dp(k)−dp(k−1), calculated by subtraction at 72 of the new value of the regulating difference dp(k) from the old value dp(k−1) (symbolically illustrated by the memory element 73), with the differential parameter rkd, and the addition at 74 of this value to the old value of the D-component dtvhd(k−1). The differential parameter rkd=frkd (nmot, dkwin) is taken from the differential parameter-performance graph 47 (see also FIG. 13) while the old value dtvhd(k−1) is readied by the storage at 75.

However, the D-component, is only active (switching module 76) as long as the regulating difference dp is larger than a threshold value dpmin and the change of the regulating difference per time ddp is larger than a threshold value ddpmin, otherwise the old value dtvhd(k−1) is maintained.

Figure 10:
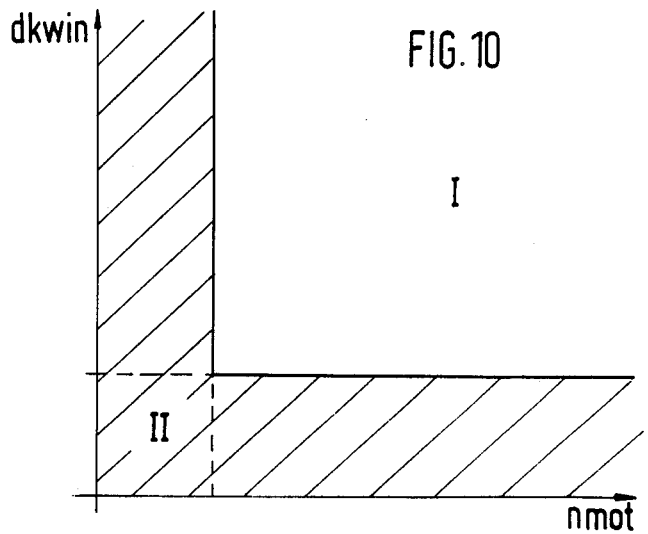
FIG. 10 is a diagram with operating ranges for anticipatory control and regulation.

The contributions of P-58, I-59 and D-component 60 are added at 77, are limited by way of a limiting module 78 to a value of an amount approximately 100 and are fed by way of the switching module 61 to the activating module 49 insofar as the regulating component is active (FIG. 10, operating point (nmot, dkwin) in the range I).

The switching module 61 further sets to zero the output of the switching module 69 in the integral module 59 and the content of the memory element 73 insofar as the calculation of the regulating component is suppressed (FIG. 10, operating point (nmot, dkwin) within the range II).

The limited regulating component dtvh is added in the activating module 49 to the pulse duty factor- anticipatory control value tvhkf, 50, and is limited at 51 to a value (pulse duty factor from the regulation and anticipatory control tvhrg within the range of 0 smaller equal to tvhrg smaller equal to 200). The dynamic limitation takes place thereat additionally:

(a) Notwithstanding the rapid shifting-over into the two-supercharger-operation at the switch-in point, a momentary Power output collaPse cannot be completely avoided with the method described so far; above all in case of a strongly dynamic manner of operation (acceleration) it becomes effective in a negative manner. The matching of the pulse duty factor-anticipatory control-performance graph optimized as regards efficiency which is designed for a quasi-stationary driving manner, shows more particularly a relatively large pulse duty factor jump in the downward direction at the switch-in point, i.e., the waste gate is noticeably opened and blows off even though this exhaust gas would be urgently needed thereat in the dynamic case in order to minimize the charging pressure collapse. Also to the regulation is not able in this case to compensate sufficiently:

The influence of the P-component, optimized for a quasi-stationary driving, does not suffice by a long shot to raise the pulse duty factor to 100, The I-component is sluggish anyhow, Even the D-component arrives too late in the build up (inter alia taking into consideration program durations and a selected valve timing frequency of, for example, 12 Hz).

The following function was introduced as remedy: During the transition from one- to the two- supercharger-operation, i.e., when the summation value from the anticipatory control and the regulation tvhrg would jump from a value greater than 100 to a value smaller than 100, the pulse duty factor is blocked at the value tvhrg=100, i.e., is held fixed.

The blocking is lifted if ddp−pso11 −pist is smaller than dpmax, i.e., the charging pressure collapse is nearly eliminated, or tvhkf becomes again larger than 100, or if a predetermined time interval tdyn has elapsed (approximately 1 second).

This function assures in the dynamic case for an acceleration-optimized switch-in behavior.

(b) If the engine is in the two-supercharger-operation —and more particularly also on the anticipatory control side—then a blocking device prevents the shifting back to the one-supercharger-operation. The thought is thereby that a brief disturbance can be rapidly compensated for the most part and by means of this blocking device a switching into the one- supercharger-operation with immediately following switching-back into the two-supercharger-operation is avoided. Additionally, this blocking behavior results in a protective function for the engine. Function: If tvhkf is smaller than 100 and tvhrg becomes larger than 100, then the blocking device is activated, i.e., tvhrg=100 is set. The blocking device remains effective as long as the prerequisite or is fulfilled.

With the use of simple valves it may be appropriate to limit the operating range and therewith the pulse duty factor to the activation limits because a well-defined operating position is not adjustable thereat or not unequivocally reproducible thereat on the basis of a selected pulse duty factor. The pulse duty factor fed to the control valve therefore receives a further static limitation (51) for which an example (dependent on realization) is given here as follows:

For 0 smaller equal tvhrg smaller than 7, tvhrg is set to 0,

For 8 smaller equal tvhrg smaller than 15, tvhrg is set to 15,

For 85 smaller equal to tvhrg smaller than 92, tvhrg is set to 85,

For 92 smaller than tvhrg smaller equal to 100, tvhrg is set to 100.

The module driver stage 52 now separates the summation signal from anticipatory control and regulation tvhrg into the individual activation signals for the control valves 23 and 24 of the switch-in valve 19 and the blow-off valve 20, and converts the same to pulse duty factor signals tzv and wg which—in case amplified as required—are fed to the control valves 23 and 24. The separation takes place as already described hereinabove by reference to FIG. 3.

Figure 14:
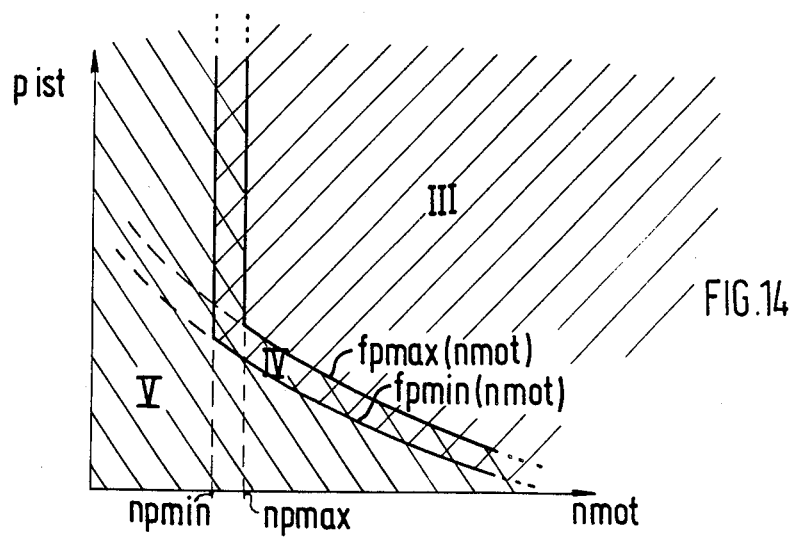
FIG. 14 is a diagram with a hysteresis characteristic curve for a control of a vent valve in accordance with the present invention.

The activation 53, 54 of the vent valve 33 assures that the second exhaust gas turbocharger 15 supplies on the compressor side a volume stream also in the non-switched-in operation in that the vent valve 33 is activated open so that pumping operation is avoided. The switching behavior of the vent valve 33 is described by two boundary lines, see FIG. 14:

of a rotational speed boundary below which the vent valve is open, a boundary line given by a nmot-characteristic curve, below which the vent valve is open.

The combined boundary lines are expanded into a hysteresis with npmax and fpmax (nmot), respectively, npmin and fpmin (nmot) in order to avoid a continuous switching-on and switching-off the valve. The vent valve 33 is therefore closed when the operating point (nmot, pist) is within the range III (cross-hatched from left bottom toward the top right) or, coming from the range III, is in the range IV (double cross-hatched), and opens when the operating point is located in the range V (cross-hatched from the left top toward the right bottom) or coming from the same, enters into the range IV.

Program modules of the system are described in the further figures. A flow diagram for the switching module 55 is illustrated in FIG. 15 which controls the output of the uncorrected pulse duty factor-anticipatory control value tvhkf' from the pulse duty factor-anticipatory controlperformance graph 41, respectively, pulse duty factor- hysteresis-performance graph 42.

At first it is examined at 79, whether the rotational speed nmot is smaller than a threshold value nmin. If yes, a performance graph flag is set to 0 at 80. If no, the following step 80 is bypassed. Subsequently, it will be examined at 81 whether nmot is larger than a second threshold nmax. If yes, the performance graph flag is set to 1 at 82; if no, this step is bypassed. It will be queried at 83 whether the performance diaphragm flag is equal to 0; if yes, the pulse duty factor is taken from the pulse duty factor-anticipatory control-performance diagram, 84. If no, it will be queried at 85 whether nmot is smaller than the second threshold value nmax. If no, the pulse duty factor is also taken from the pulse duty factor-anticipatory control-performance graph, 84; if yes, the pulse duty factor is determined at 86 from the pulse duty factor-hysteresis-performance graPh.

FIG. 16 illustrates a flow diagram for determining the integral component. It will at first be examined at 87 whether one of the freezing conditions described hereinabove is fulfilled. If no, a new value of the I-component dtvhi(k) is calculated at 88; if yes, the component dtvhi(k) is set at 89 equal to the old value dtvhi(k−1) calculated in the preceding program pass. The limitation of the I-component as regards amount takes place subsequent thereto at 90.

Figure 17:
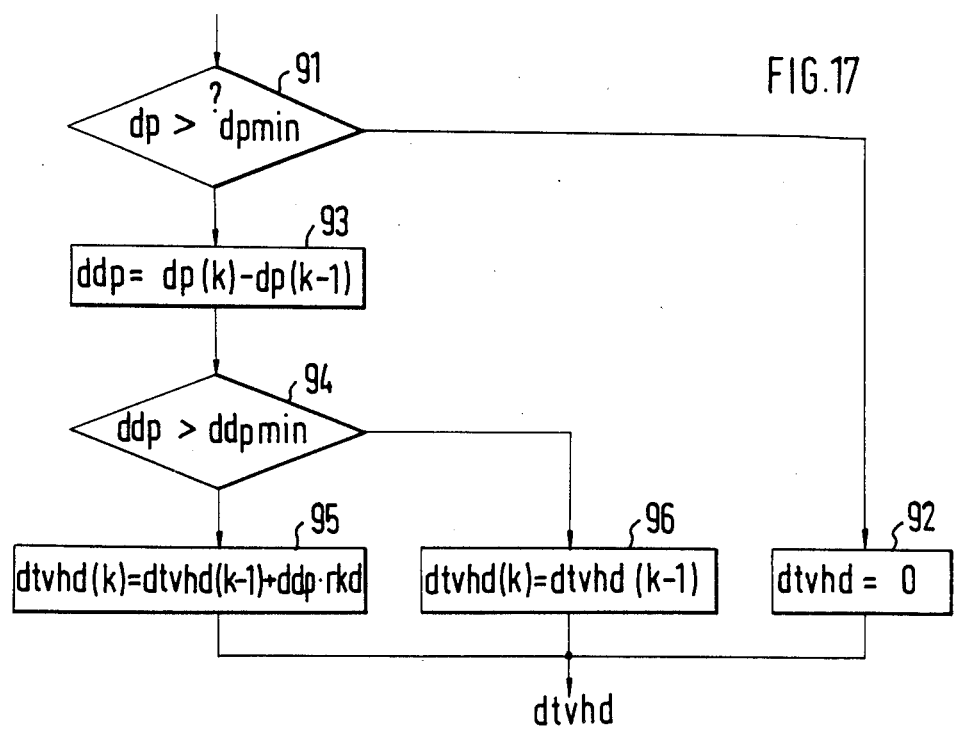
FIG. 17 is a flow diagram of a differential component module in accordance with the present invention.

In the flow diagram for determining the differential component according to FIG. 17, it will at first be examined at 91 whether the regulating difference is larger than a first threshold value dpmin. If no, the differential component dtvhd is set to 0 at 92. If yes, the change per time of the regulating difference ddp=dp(k) dp(k−1 ) is calculated in a further step at 93, and it is then examined at 94, whether the change per time of the regulating deviation ddp is larger than a second threshold value ddpmin. If yes, the new value of the differential component dtvhd(k) is calculated anew, at 95. If no, the differential component dtvhd(k) is set at 96 equal to the old value dtvhd(k—1) as determined in the preceding program pass.

Figure 18:
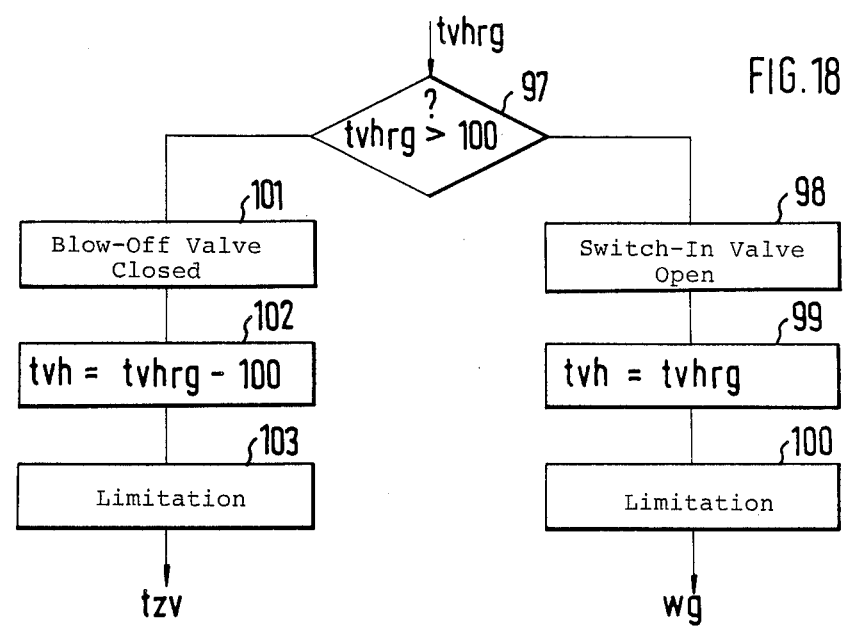
FIG. 18 is a flow diagram of a valve control module in accordance with the present invention.

Finally, FIG. 18 illustrates how the split-up of the pulse duty factor value from control and regulation is separated for the activation of the switch-in valve, respectively, blow-off valve. In a first step, it is examined at first at 97 whether the summation value from the anticipatory control and regulation tvhrg is larger than 100. If no, the switch-in valve is not activated (switch-in valve open) at 98 and the pulse duty factor value tvh is set equal to tvhrg at 99.

The limitation of the pulse duty factor tvh 100 takes place in the next step, as described more fully hereinabove. The control valve of the blow-off valve is cyclically activated with the limited pulse duty factor wg.

If by contrast the condition 97 is fulfilled, then the blow-off valve is fully activated, i.e., it is closed at 101, and the pulse duty factor tvh is determined at 102 from the difference of the summation value from anticipatory control and regulation tvhrg and the value 100. Subsequently, the pulse duty factor is again limited at 103 corresponding to the adjustable range and the control valve 23 of the switch-in valve 19 is cyclically activated with the limited pulse duty factor tzv.

Of course, characteristic curves, performance graphs (family of curves), limit and threshold values are not generally valid but are merely indicated as an example for a certain internal combustion engine. However, they illustrate an approach how they must be in principle and can be readily matched in supercharged internal combustion engines, respectively, where the strong points of the optimization work are to be placed.

Figure 19:
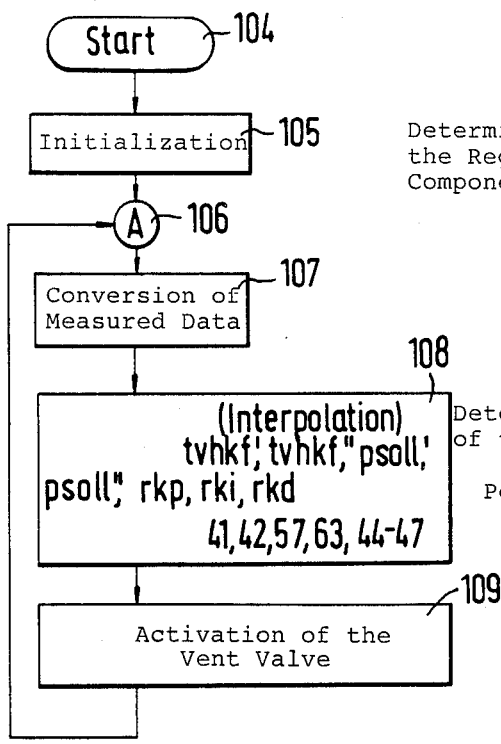
FIG. 19 is a flow diagram of a main program in accordance with the present invention.
Figure 20:
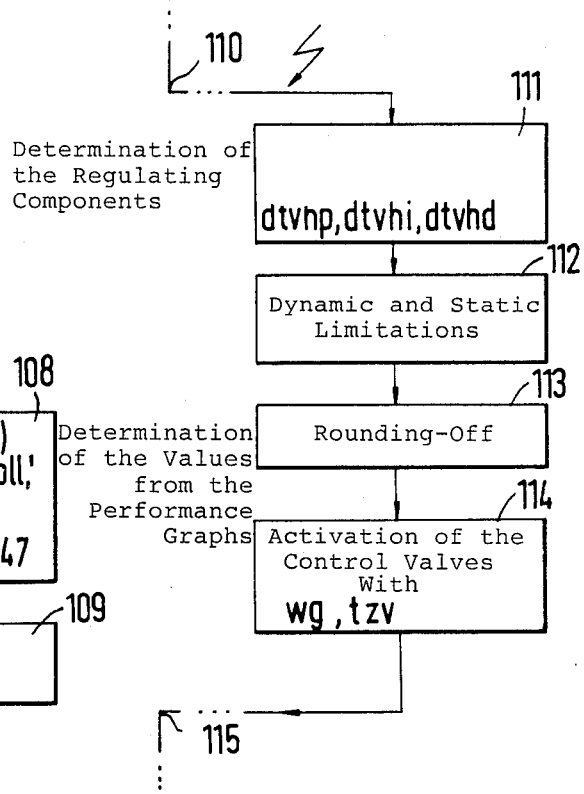
FIG. 20 is a flow diagram of a first interrupting program in accordance with the present invention.
Figure 21:
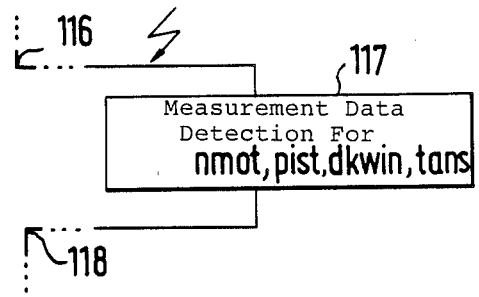
FIG. 21 is a flow diagram of a second interrupting program in accordance with the present invention.

Flow diagrams according to FIGS. 19 to 21 illustrate an example for an operation in principle of the individual program steps. In the main program (FIG. 19), an initialization 105 of the computer takes place after the start 104 which resets the operating memory, flags, etc. and assigns the variables with starting values. After passing a mark A at 106, the raw data of the measurement data detected in the second interrupting program to be described more fully hereinafter, are prepared at 107. An interpolation/extrapolation 108 of the values follows subsequent thereto which are to be determined from characteristic curves and performance graphs: tvhk, tvhh, tvhkf", psol1 , psol1', rkp, rki and rkd. Prior to the determination of the uncorrected pulse duty factoranticipatory control value tvhkf', of course, the processing of the program module according to FIG. 15 takes place. Finally, the activation of the vent valve 33, 109 and the return jump to the mark A, 106 takes place.

The first interrupting program illustrated in FIG. 20 interrupts the main program 110. It is time-controlled and is operated approximately every 10 ms. It determines at 111 the regulating components (dtvhp, dtvhi (corresponding to FIG. 16) and dtvhd (corresponding to FIG. 17)). A determination of the static and dynamic limitations takes place subsequently at 112. Finally, the rounding-off 113 of the activation signals to the operating range of the control valves 23 and 24 takes place and the activation 114 thereof with the pulse duty factors wg and tzv corresponding to FIG. 18 and the return jump 115 into the main program.

The second interrupting program according to FIG. 21 is operated with higher priority and interrupts both the main as also the first interrupting program, 116. In a given case, it is controlled ignition-synchronously, i.e., it is called up once per rotation of the internal combustion engine, for example, by an engine management computer which also readies in that case the measurement data for the measurement data detection 117 of nmot, pist, dkwin and t11. The measurement data detection 117 may, of course, also take place by the control apparatus 25 itself The return jump to the interrupted program takes place again subsequent thereto at 118.

While we have shown and described only one embodiment in accordance with the present invention, it is understood that the same is not limited thereto but is susceptible of numerous changes and modifications as known to those skilled in the art, and we therefore do not wish to be limited to the details shown and described herein, but intend to cover all such changes and modifications as are encompassed by the scope of the appended claims.

We claim:

1. A multi-cylinder internal combustion engine, comprising at least two exhaust gas turbocharger means each including a turbine and a compressor driven by said turbine, a suction manifold, the compressors being operatively connected to said suction manifold by way of separate charging pressure lines, an exhaust gas manifold, separate exhaust gas line operatively connecting the turbines with said exhaust gas manifold, one of said exhaust gas turbocharger means being operable to be switched-in during the operation of the internal combustion engine to operate in addition to the other exhaust gas turbocharger means, a by-pass line from the exhaust gas manifold and by-passing the turbines of both exhaust gas turbocharger means, a controllable blow-off valve means in said by-pass line, a controllable switch-in valve means in the exhaust gas line of the turbine of the exhaust gas turbocharger means adapted to be switched-in, said check valve being operable to open after opening of the switch-in valve means by the pressure building up in the charging air line, electronic control means for controlling the blow-off valve means and the switch-in valve means in dependence on operating parameters of the internal combustion engine detected by sensor means, anticipatory control means for generating an anticipatory control signal in dependence on said operating parameters, regulating means for generating a regulation signal in dependence on at least a suction pipe operating parameter, and said electronic control means controls said blow-off valve means and said switching valve means as a function of both said anticipatory signal and said regulation signal.

2. A multi-cylinder internal combustion engine according to claim 1, wherein said blow-off valve means is a waste gate.

3. A multi-cylinder internal combustion engine according to claim 1, wherein the internal combustion engine includes cylinder means combined into two groups, one exhaust gas turbocharger means including a turbine and a compressor being coordinated to each group, the compressors of both exhaust gas turbocharger means being operatively connected by way of separate charging pressure lines to the suction manifold leading to both cylinder groups, and the turbines of both exhaust gas turbocharger means being located in separate exhaust gas lines from the exhaust gas manifold of both cylinder groups, and one of the exhaust gas turbocharger means being operable to be switched-in during the operation of the internal combustion engine to operate in addition to the other exhaust gas turbocharger means.

4. An internal combustion engine according to claim 1, wherein the engine rotational speed and the position of a power output control means of the internal combustion engine are utilized as operating parameters for the anticipatory control means.

5. An internal combustion engine according to claim 4, wherein the power output control means is a throttle valve.

6. An internal combustion engine according to claim 4, wherein said regulating means is responsive to other parameters.

7. An internal combustion engine according to claim 6, wherein the regulating means has PID structure.

8. An internal combustion engine according to claim 6, wherein the electronic control means includes means for dynamically limiting the control of the blow-off valve means and of the switch-in valve means.

9. An internal combustion engine according to claim 8, wherein the control of the blow-off valve means and of the switch-in valve means receives a charging-air-temperature-dependent correction.

10. An internal combustion engine according to claim 9, further comprising a vent valve means arranged in a by-pass means with respect to the compressor of the turbocharger means adapted to be switched-in, said vent valve means being operable to be controlled by the electronic control means in dependence on operating parameters of the internal combustion engine detected by the sensor means, the vent valve means being so controlled in dependence on operating parameters that a pumping of the exhaust gas turbocharger means adapted to be switched-in is avoided, said electronic control means controls said vent valve means to be closed when the rotational speed and the suction pipe pressure are in a region of a plane of the condition space of the operating parameters of the internal combustion engine determined by the rotational speed and by the suction pipe pressure, said region being delimited toward the left by an upper boundary valve and an upper rotational speed-suction pipe-characteristic line, and controls said vent valve means to be opened when the rotational speed and suction pipe pressure are in a region of said plane which is delimited toward the right by a lower boundary and a lower rotational speed-suction pipe pressure-characteristic curve.

11. An internal combustion engine according to claim 10, wherein the switch-in valve means and the blow-off valve means are valves opened in the non-activated condition and actuated by pneumatic auxiliary energy, the auxiliary energy being fed by way of cyclically operated control vlaves and closed in the non-activated condition, said control valves being activated by means of a pulse duty factor from the electronic control means.

12. An internal combustion engine according to claim 11, wherein the pneumatic auxiliary energy is taken off from the suction manifold upstream of the power output control means.

13. An internal combustion engine according to claim 12, wherein said control valves control the closing degree of the switch-in valve means and the closing degree of the blow-off valve means continuously within the range between 0% and 100%.

14. An internal combustion engine according to claim 13, wherein the one control valve coordinated to the switch-in valve means is operated with a first pulse duty factor lying between 100 and greater than 0 only when the other control valve coordinated to the blow-off valve means is fully activated at a second pulse duty factor, and the other control valve is operated with a second pulse duty factor lying between 100 and 0 only when the one control valve is not activated with the first pulse duty factor about 0.

15. An internal combustion engine according to claim 14, wherein the first pulse duty factor and the second pulse duty factor is defined by a reference number lying within a common numerical range, whereby the common numerical range is subdivided into a first range and into a second range.

16. An internal combustion engine according to claim 15, wherein said first range is between about 200 and greater than 100 and wherein said second range is between about 100 and 0.

17. An internal combustion engine according to claim 15, wherein a one-supercharger-operation is formed by the first range and a two-supercharger-operation is formed by the second range, whereby said electronic control means controls the switch-in valve means to be increasingly opened with a decreasing activation value in the first range and be fully open in the second range while controlling the blow-off valve means to be closed in the first range and with a decreasing activation value to be increasingly opened in the second range.

18. An internal combustion engine according to claim 17, wherein the anticipatory control means includes a pulse duty factor-anticipatory control-performance graph means for coordinating a pulse duty factor-performance graph value lying between 200 and 0 to the actual value of the rotational speed and the throttle valve angle using characteristic load lines an characteristic rotational speed lines.

19. An internal combustion engine according to claim 18, wherein each characteristic load line (dkwin=constant) in the pulse duty factor-anticipatory control-performance graph means has a steep jump in the pulse duty factor-performance graph value over the rotational speed from one-supercharger-operation to two-supercharger-operation.

20. An internal combustion engine according to claim 19, wherein each characteristic rotational speed line (nmot=constant) of the pulse duty factor-anticipatory control-performance graph has a steep jump in the pulse duty factor-performance graph value at the lower end of the value range of the throttle valve angle which causes the same to stay at the maximum value below a rotational speed limit value for the switching into the two-supercharger-operation and at the switch-in point above this rotational speed limit value.

21. An internal combustion engine according to claim 20, wherein with quasi-stationary operation of the internal combustion engine at the switch-in point a constant to-and-fro switching between the one-supercharger operation and the two-supercharger operation is avoided by means for determining the uncorrected pulse duty factor-anticipatory control value from a pulse duty factor-hysteresis-performance graph means when the rotational speed drops into a range between a first limit value and a second limit value and otherwise from the pulse duty factor-anticipatory control-performance graph means.

22. An internal combustion engine according to claim 21, wherein said electronic control means including summing means for summing the pulse duty factor-anticipatory control value which is the sum of a proportional component, of an integral component and of a differential component.

23. An internal combustion engine according to claim 22, wherein said summing means only adds said pulse duty factor-anticipatory control value when the rotational speed and the throttle valve angle lie simultaneously above a threshold value determinative for the start of the regulation.

24. An internal combustion engine according to claim 23, including means for determining a desired value for the regulation as a function of operating parameters from a charging pressure-desired value-performance graph means.

25. An internal combustion engine according to claim 24, including means for calculating the regulating component in fixed time intervals.

26. An internal combustion engine according to claim 25, including means for calculating the proportional component of the PID regulating means by multiplication of the regulating deviation with the condition-magnitude-dependent proportional parameter whereby the proportional parameter is determined from a proportional parameter-performance graph means.

27. An internal combustion engine according to claim 26, including means for calculating the integral component at a given instant from the sum of the integral component at a prior instant and the product of the regulating deviation with the condition magnitude-dependent integral parameter, whereby the integral parameter is determined from an integral parameter performance graph means.

28. An internal combustion engine according to claim 27, including means for suppressing the calculation of the actual value of the integral component and setting the actual value of the integral component at the given instant equal to the value of the value of the integral component calculated at the prior instant when at least one of the following conditions is fulfilled:
the amount of the regulating deviation is greater than a maximum value;
the summation value from the anticipatory control means and the regulating means calculated at the prior instant lies at the upper end of the numberical range and the regulating deviation is greater than 0;
the summation value from the anticipatory control means and the regulation means calculated at the prior instnt amounts to 0 and the regulation deviation is smaller than 0;
the summation value from the anticipatory control means and the regulating means calculated at the prior instant lies at the swithc-in point and the regulating deviation is greater than 0 and the system is in the two-supercarger-operation.

29. An internal combustion engine according to claim 28, including means for limiting the amount of the integral component to a predetermined value.

30. An internal combustion engine according to claim 29, including means for calculating the differential component at the given instant from the sum of the differential component at the prior instant and the product of the condition magnitude-dependent differential parameter and the difference of the regulating deviations at the given and prior instants, whereby the differential parameter is determined from a differential parameter-performance graph means.

31. An internal combustion engine according to claim 30, including means for setting the differential component equal to 0 when the regulating deviation is smaller than a positive threshold value.

32. An internal combustion engine according to claim 31, wherein the means for calculating the differential component calculates anew only when the difference of the regulating deviations is larger than a positive threshold value.

33. An intenal combustion engine according to claim 32, including means for limiting the summation value of the regulating means which results from the sum of the proportional component, of the integral component and of the differential component to a maximum value.

34. An internal combustion engine according to claim 33, including means for setting the summation value from the anticipatory control means and regulating means is set to the lower limit of the common numerical range when the summation value from the anticipatory control means and from the regulation means lies below the lower limit of the common numerical range, respectively, and to the upper limit of the common numerical range when the summation value from the anticipatory control means and from the regulating means lies above the upper limit of the numerical range.

35. An internal combustion engine according to claim 34, including a first dynamic limitation means for fixing the summation value from the anticipatory control means and from the regulating means at the switch-in point as long as the anticipatory control value is in the second range, and the sum from the anticipatory control signal and the regulating signal is in the first range.

36. An internal combustion engine according to claim 35, including a second dynamic limitation means for fixing the summation value at the switch-in point during the transition from the one-supercharger-operation into the two-supercharger-operation as long as at least one of the following conditions is not yet fulfulled:
the regulating difference is smaller than a threshold value;
the pulse duty factory anticipatory control value is larger than the sum of the value at the switch-in point and a threshold value;
a predetermined time interval has elapsed.

37. An internal combustion engine according to claim 36, wherein said electronic control means, in response to the summation value from the anticipatory control means and the regulating means which lies within the first range, completely activates the control valve of the blow-off valve means and activates the control valve of the switch-in valve means with a first activating value corresponding to a first pulse duty factor which results from the difference of the summation value and the value of the switch-in point, and in response to a summation value smaller of equal to the value of the switch-in point, activates the control valve of the switch-in valve means and activates the control valve of the blow-off valve means with an activating value that corresponds to the summation value.

38. An internal combustion engine according to claim 37, including means for limiting the first pulse duty factor and the second pulse duty factor to the operating range of the control valves.

39. An internal combustion engine according to claim 38, wherein the sensor for the suction pipe pressure is in the suction manifold downstream of the power output control means.

40. An internal combustion engine according to claim 39, wherein the electronic control means is a microcomputer.

41. An internal combustion engine according to claim 40, wherein the performance graph means and the characteristic curves are made discrete at the restart points and are stored in non-volatile memories and the microcomputer determines the function values for dependent variables which lie between restart values by interpolation and/or extrapolation or quantization.

* * * * *